No. 690,480. Patented Jan. 7, 1902.
C. G. STRUBLER.
SCALE.
(Application filed Oct. 23, 1899.)
(No Model.)
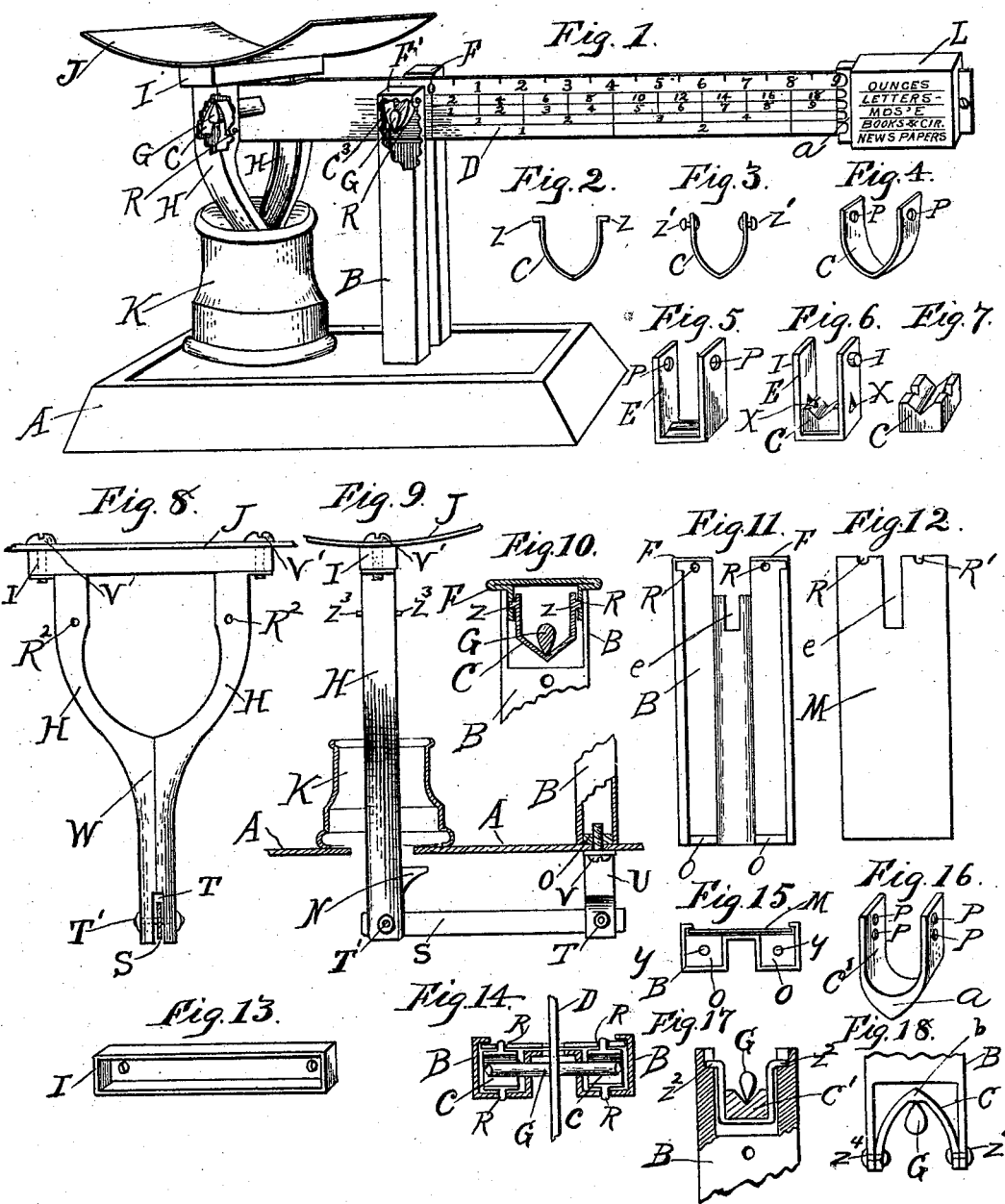

UNITED STATES PATENT OFFICE.

CHARLES G. STRUBLER, OF ELKHART, INDIANA.

SCALE.

SPECIFICATION forming part of Letters Patent No. 690,480, dated January 7, 1902.

Application filed October 23, 1899. Serial No. 734,491. (No model.)

*To all whom it may concern:*

Be it known that I, CHARLES G. STRUBLER, a citizen of the United States, residing at Elkhart, in the county of Elkhart and State of Indiana, have invented certain new and useful Improvements in Scales; and I do hereby declare the following to be a full, clear, and exact description of the invention, such as will enable others skilled in the art to which it appertains to make and use the same.

This invention relates to scales, and has for its object improvements in that class of scales which is especially adapted to be used for weighing accurately light articles, such as mail-matter and similar articles, where a sensitive balance or scale is required. The scale is of that class also in which the matter to be weighed is balanced by a poise that slides along a graduated beam, and the graduated beam is provided with indicating characters which indicate to the user the price of articles purchased or in case of a postal scale the amount of postage to be paid on the package whose weight is being determined. Such a scale is usually provided with several rows of indicating characters, the first or top line of which indicates ounces or half-ounces and a second of which indicates the price of postage on first-class mail-matter for the number of ounces in the first line. The third line indicates the postage on second-class matter, such as merchandise. The fourth line indicates the amount of postage required on third-class mail-matter, such as books and circulars, and the fifth line indicates the amount of postage required on fourth-class mail-matter, such as newspapers.

The invention also relates to the construction of the scale of sheet metal in a way that shall be light, strong, and durable, and it also relates to certain novel features of construction, which will be set forth at length in the specification.

In the drawings, Figure 1 is a perspective view. In this view a portion of the top of one of the bearing-posts is shown as broken away and a portion of one of the knife-edge bearings under the scale-pan is also shown as broken away. Fig. 2 is an elevation of a scale-bearing with its own supporting-bearings made integral with it. Fig. 3 is an elevation of the scale-bearing with its own supporting-bearings made in the form of loose pins. Fig. 4 is a perspective of the bearings shown in Fig. 3, omitting, however, the pins which support it. Fig. 5 is a perspective of a bearing with a bottom cross-plate rectangular to the sides. Fig. 6 is a perspective of a bearing-support similar to that shown in Fig. 5, but with its own supporting-bearings made integral with it. It also shows a separable knife-edge bearing made of hard material and held in the bearing-support by inwardly-bent members, which engage over the separable bearing. Fig. 7 is a perspective of the knife-edge bearing which forms part of the device shown in Fig. 6. Fig. 8 is a front elevation of the hanger which supports the scale-pan. Fig. 9 is a side elevation of the hanging-post, and this figure shows also a tie-bar which holds the hanger vertical. Fig. 10 is a detail of the scale-bearing, showing its connection with the post. Fig. 11 is a detail showing an incomplete scale-beam-supporting post. Fig. 12 is a detail showing the plate which completes the post. Fig. 13 is a detail showing the bar or cap which unites the forks of the scale-hanger. Fig. 14 is a sectional view across the supporting-post just above the bearings. In this figure the cross-bar or knife-bar of the beam is shown as resting in the bearings. Fig. 15 is a plan view of the post B with the cap removed. Fig. 16 shows a modified form of bearing-support. Fig. 17 is a sectional view showing a wire bearing-support in which there is a bearing-block of hardened material. Fig. 18 shows a knife-edge bearing for the hanger, this bearing being reversed in position from that used with the posts.

A indicates the scale-base, from which rises a post B, made of sheet metal bent to the form shown in Fig. 15, and Fig. 1, one of the two pieces composing the post is bent to form the sides of two parallel vertical posts joined by a web and having that side of each post which lies adjacent to the web open, and this open side is closed by the piece M. At the base of each vertical post part is a fillet-block O, secured to the side walls of the post, and the fillet-block O is perforated with a screw-threaded hole Y, and the posts are held to the base by driving a screw V through properly-located holes in the base-top into the fillet-blocks O. Near the upper end of the posts the web M is slotted for the reception of the scale-beam D, which is here provided with a cross-bar G, and the cross-bar has knife-edges on its lowermost side, which rest in bearings C. The bearings C are open bearings, which at the post have the open mouth turned upward, and each bearing C has two individual pins, on which it swings. These pins may be made integral with the bearing, as shown at Z in Fig. 2 and at I in Fig. 6 and at Z² in Fig. 17, or they may be loose pins, as shown at Z' in Fig. 3. In either case the bearing constitutes a swinging stirup with an open mouth, into which the knife-edge bar can be readily inserted and in which the knife-edge bar is retained after it has once been inserted by caps F. This support as a whole comprises a post which has a broad bearing connected with the top plate of the base A and in which the two side bars of the post are secured together, so that they always remain stable with respect to each other, and the two stirrups which furnish the bearings for the knife-edge while capable of independent swinging motion are always held with their own pivots in fixed relation the one to the other, and consequently the bearing contact parts between the stirrups and knife-edges adapt themselves readily to parallelism with the posts and always remain in such parallelism. The scale-beam can readily be inserted between the parts of the post and is held in position by the caps F. The stirrup C is inserted in place by placing one of its trunnion bearings or pins Z through the hole R in the part B of the post and dropping the other trunnion or pin in the notch R' of the piece M. The notch R' may be made as a whole if the stirrup-supports are loose pins Z'.

The hanger which supports the scale-pan is made from two pieces of metal bent and shaped to form a section of a tube which is irregular in shape, presenting in one view the appearance shown in Fig. 9 and in another the appearance shown by the part H in Fig. 8, and in still another view the hollow is shown as appears in Fig. 1. In the assembled hanger the lowermost parts are brought together and joined at the line W and at this joint are secured together by soldering or in any other appropriate way, and the assembled hanger has the form of a fork, of which the stem is hollow and the branches are open semitubular structures, with the cavities turned toward each other. The ends of the branches are joined by a cap I in Fig. 13, on which rests the scale-pan J. At the lower end of the hanger is a notch T, in which is inserted a link S, and the link is joined to the hangers by a pin. The link extends to a hanger V underneath the upper plate of the base A and is joined to the hangers V by a pivot T'. The scale-pan hanger rises through the upper plate of the base A through an ornamental guard K, that rises to about the divergence of the forks of the hanger. In the cavity of each hanger is inserted a stirrup similar in construction to the stirrup C; but this stirrup has its open mouth downward and is held in position by its individual bearing trunnions or pins, which engage through holes R².

The stirrup may have that part of it which bears directly on the knife-edge formed as a part of the stirrup, as is shown in Figs. 2 and 3, or it may have an interposed block of hard material, such as steel or agate, secured by any suitable means in the stirrup itself. The form of stirrup shown in Fig. 17 is simply a bent wire, of which the ends form the pins Z², and the surface against which the knife-edge bears is an interposed block C'. In the form shown in Fig. 6 the hardened bearing-block is held in a pivoted case by inwardly-extending members that engage the bearing-block. The holding members are produced by punching or bending in a portion of the case-walls.

The poise L is a perforated block arranged to slide on the beam D, and it is provided with indicating-points opposite each of the graduation-lines of the beam. It also has imprinted on it proper indicating terms opposite each point to denote the use for which each line of graduation is intended.

What I claim is—

1. In a scale, the combination with bearing-posts and a scale-beam, of open-mouthed knife-edge bearings each of which is provided with a journal-pin at each side thereof, the pins being spaced from each other to permit the knife-edge bar to pass between them, substantially as described.

2. In a scale, the combination with posts united by a web and secured to the scale-base, of a pair of open-mouthed edge-bearing stirrups, each provided with a journal-pivot at each side thereof, and caps placed above the open mouth of said stirrups, said pivots being spaced to allow the knife-edge bar to pass between them, substantially as described.

3. In a scale, the combination with hollow posts united by a web and secured to the scale-base, of open-mouthed knife-edge-bearing stirrups pivoted into the cavities of the posts and adapted to receive the knife-edge bar between the pivots, and a cap closing the posts above the stirrups, substantially as described.

4. In a scale, the combination with the scale-beam and supporting-post therefor, of a scale-pan, a hollow scale-pan hanger, an open-mouthed stirrup and independent pivots engaging each side of the stirrup within the cavity of the hanger, the pivots being spaced to permit the passage of the knife-bar between them, substantially as described.

5. In a scale, the combination with hollow posts, of open-mouthed stirrups in said posts, a knife-edge bar having its bearings in said stirrups, and means for independently pivoting each side of the stirrups in said posts, the supporting-pivots being spaced to allow the passage of the knife-edge bar between them, substantially as described.

6. In a scale, the combination with an integral bearing-block support, the block-seat whereof is formed by a base and two opposing side walls, at least one side wall being provided with an inwardly-extending lug, the distance of which from the base is less than the prevailing thickness of the bearing-block, of a bearing-block grooved on one side transversely to the line of the knife-edge bearing whereby the block is so reduced in thickness in the plane of the groove as to fit between said lug and base when the block is in its seat and as to be incapable of removal therefrom without bending the support, substantially as described.

7. In a scale, the combination with the beam, of a scale-pan and a scale-pan hanger made from bent sheet metal united at the lower part of said hanger and branching at the upper part thereof, each branch being provided with a cavity for the reception of knife-bearing stirrups, substantially as described.

8. A post for scales made from sheet metal bent to form a double post, the parts of which are united by a web, each part of said post being hollow and arranged to receive within the cavity the scale-bearing stirrups, substantially as described.

9. In a scale, the combination with the scale-beam, of a supporting-post made from sheet metal bent to form a double post the parts of which are united by a web, and fillet-blocks secured to each part of the double post and provided with screw-holes, whereby the post may be secured to the scale-base substantially as described.

10. In a scale, the combination with an integral bearing-block support, the block-seat whereof has a bearing-surface between two opposite side walls, at least one side wall being provided with an inward extension, the distance of which from the bearing-surface of the base is less than the prevailing thickness of the bearing-block, of a bearing-block grooved on one side transversely to the knife-edge bearing, whereby the block is so reduced in thickness in the plane of the groove as to engage between the bearing-surface at the base and the inward extension, so as to be incapable of removal therefrom without distorting the parts, substantially as described.

11. A bearing-block for the pivots of a scale having grooves crossing the bearing-face at right angles to each other, one of said grooves being adapted to engage a scale-pivot, and the cross-groove being adapted to engage retaining-points, substantially as described.

12. The combination of a pivoted bearing-block support provided with side walls having inwardly-bent parts arranged to prevent the bearing-block from escaping vertically from its seat, and a bearing-block having recesses or notches adapted to interlock with said parts to prevent the longitudinal displacement of the bearing-block.

13. In combination with the bearing-block for the pivots of a scale having grooves crossing the bearing-face at right angles to each other, a supporting-stirrup of sheet metal having points punched inward and arranged to engage loosely in the opposite ends of one of said grooves, substantially as described.

14. The combination of a loosely-mounted open-ended bearing-block support provided with side walls having inward-bent parts arranged to prevent the bearing-block from escaping vertically from its seat, and means whereby the bearing-block engages with said projecting parts of the support and is prevented from escaping longitudinally, substantially as described.

15. The combination of an open-ended bearing-block support provided with side walls having inwardly-bent parts arranged to prevent the bearing-block from escaping vertically from its seat and means whereby the block engages with said projecting parts of the support and is prevented from escaping longitudinally, substantially as described.

16. In a postal scale, the combination with a computing-beam and its knife-edge bearings, of a double post the parts of which are united by a web, each part of the double post being hollow and arranged to receive within the cavity the scale-bearing stirrups, and a scale-pan having a hanger made from bent sheet metal united at the lower part of said hanger and branching at the upper part thereof, each branch forming a cavity for the reception of the scale-pan-bearing stirrups, substantially as described.

17. In a scale, the combination with an integral bearing-block support, the block-seat whereof is formed by a base and two opposing side walls each of which is provided with means for pivotally mounting the same, of a bearing-block of hard material formed with a groove upon one side and held against vertical movement by inwardly-bent parts of the side walls, said parts engaging into the grooves of the bearing-block.

18. The combination with a bearing-block, of a bearing-block support formed of a strip of sheet metal bent into the shape of a yoke open at one end and closed at the other end and formed into a seat for the bearing-block and inwardly-extending projections integrally formed with the block-support and adapted to hold the bearing-block in position on the seat.

19. The combination with a bearing-block, of a bearing-block support forming a three-sided bearing for the bearing-block, said bearing-block support made of a single piece of sheet metal and integrally formed with inward projections adapted to hold the bearing-block in position in the support and with means for pivotally mounting the support.

20. The combination with a hollow bearing-post, of a cap-support on top of said post and having depending flanges, and an open-mouthed knife-edge-bearing stirrup pivotally secured in said depending flanges, substantially as described.

21. The combination with a hollow supporting member having holes formed in two opposite side walls, of an open-mouthed knife-edge-bearing stirrup pivotally mounted in said member free to swing, said stirrup made from a strip of sheet metal and provided at the open ends with outwardly-projecting trunnions engaging into the holes of the supporting member.

In testimony whereof I affix my signature in presence of two witnesses.

CHARLES G. STRUBLER.

Witnesses:
 NELLIE SEILER,
 ANNA YODER.